Aug. 20, 1940.   J. F. EATON ET AL   2,212,153
VIBRATION DAMPENER
Filed Feb. 10, 1938   3 Sheets-Sheet 1
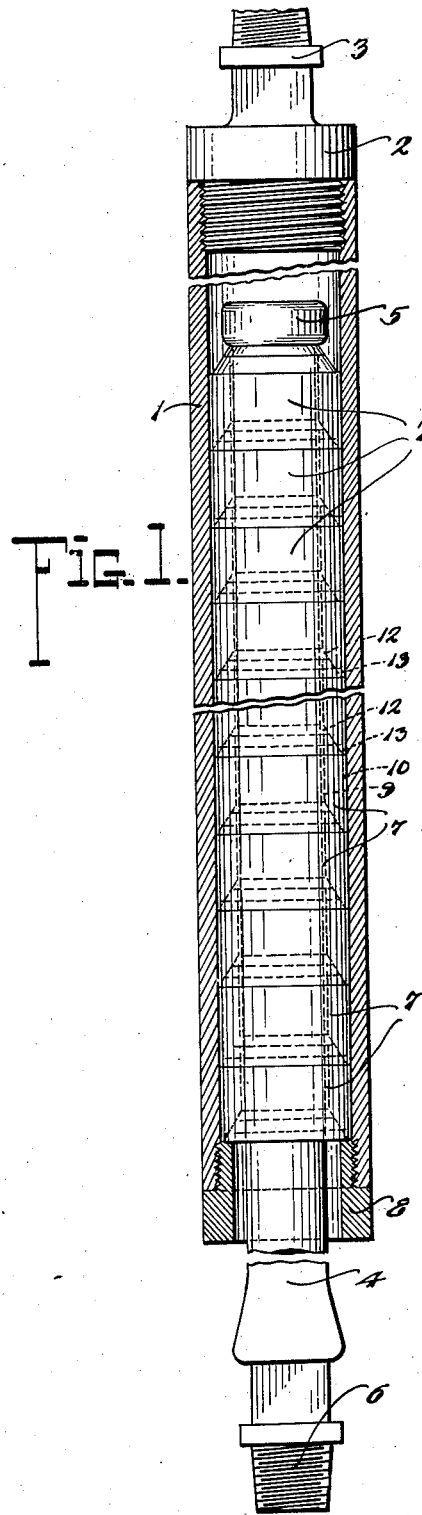
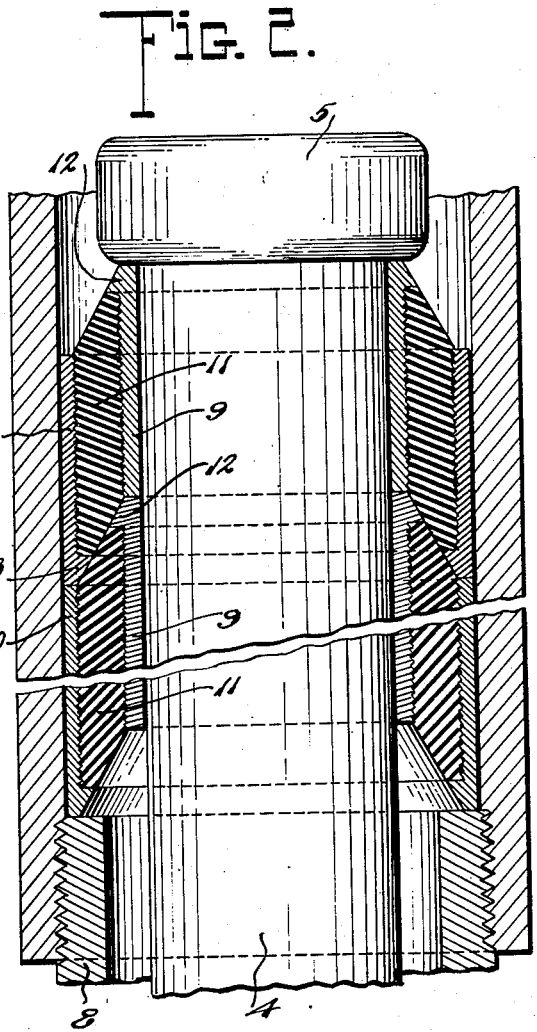
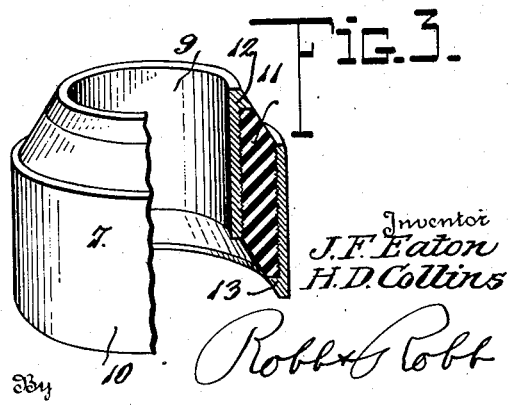
Inventor
J. F. Eaton
H. D. Collins
By Robb & Robb
Attorneys

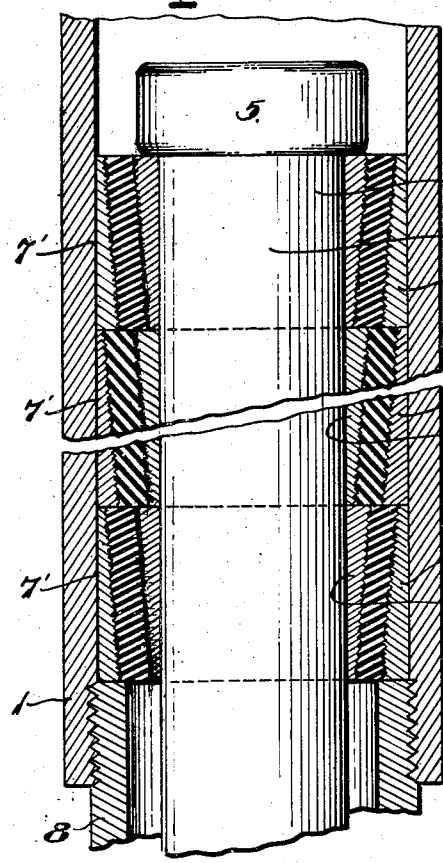
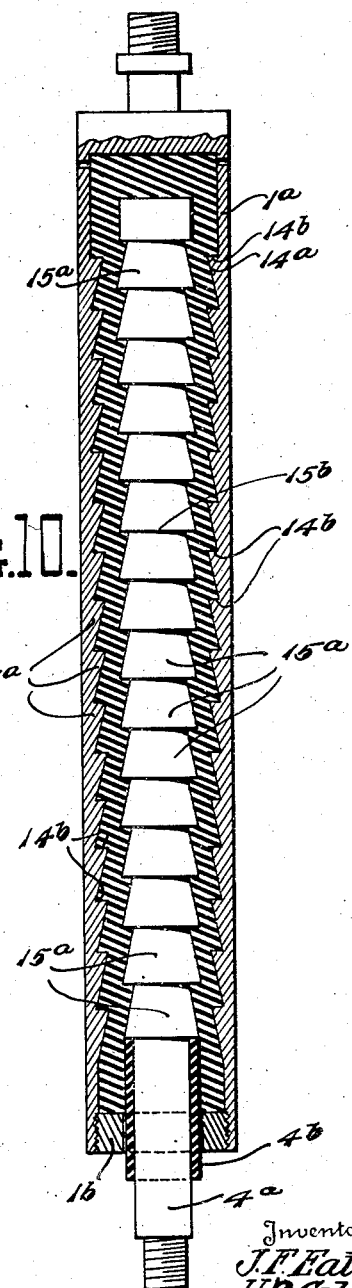
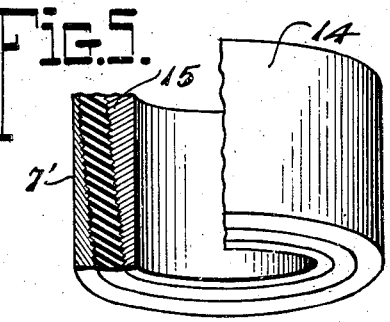

Aug. 20, 1940.    J. F. EATON ET AL    2,212,153
VIBRATION DAMPENER
Filed Feb. 10, 1938    3 Sheets-Sheet 3
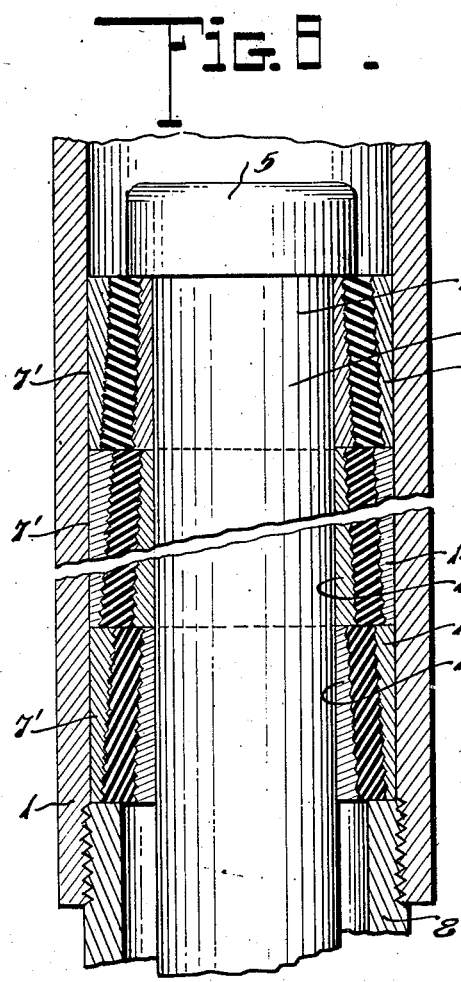
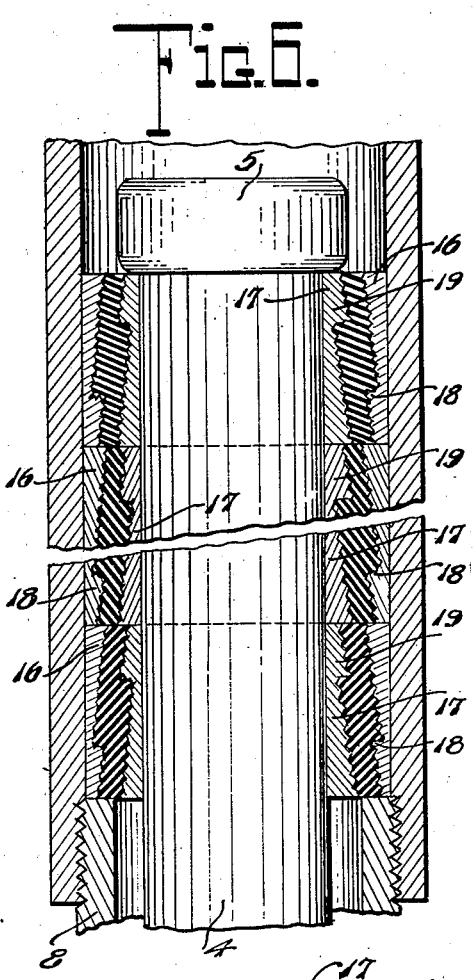
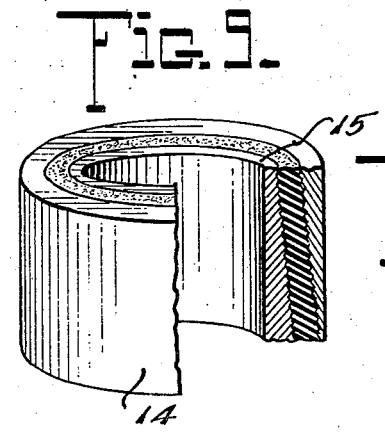
Inventors
J. F. Eaton
H. D. Collins
By Robb & Robb
Attorneys Patented Aug. 20, 1940

2,212,153

UNITED STATES PATENT OFFICE 2,212,153

VIBRATION DAMPENER

John F. Eaton and Hubert D. Collins, Tulsa, Okla.

Application February 10, 1938, Serial No. 189,853

5 Claims. (Cl. 255—28)

The present invention relates to improvements in vibration dampeners, designed especially for use in sucker rod lines for pumps.

It is well known that in the operation of sucker rod pumps, particularly in deep oil or water wells, a considerable amount of vibration is created which materially reduces the life of the reciprocating rods and ultimate breakage results due to fatigue of the metal, especially at the joints.

Sucker rod vibrations originate from the operating mechanism at the top of the well and likewise arise from the pump plunger at the bottom of the rod pounding fluid when the working barrel is only partly full of fluid, as is the case when gas is in the oil. Vibration is also caused by the travelling valve, or upper valve, attached to the bottom of the rods and built into the pump plunger, pounding shut on its seat on every stroke. The slapping of the rods inside the tubing also sets up vibrations, and all these vibrations referred to are of high frequency order, incapable of being eliminated by compression springs or like mediums.

It is the primary object of our invention, therefore, to provide a non-metallic insulating medium in the rod string at any intermediate point in its length to prevent the transmission of vibrations through said string during pumping operations.

Another object of this invention is to provide a rubber or elastic composition member arranged in shear in the connection between the sections of the sucker rod, the tensile load or pull on the rod setting up initial stress in the rubber.

A further object in view is the provision of a dampener device composed of rubber insulation intermediate of and bonded to cooperating rod sections in shear relation and combined with means for preventing the tearing apart or separation of the bonded surfaces under distortional stresses.

A still further object resides in the provision of vibration dampening means in the form of a unit composed of an outer jacket or shell, a central rod or pin member and one or more insulating sleeve units arranged between the same, together with stress-receiving means effecting relative movement between the outer and inner walls of the sleeve unit and transposing of the longitudinal load stresses into transverse compression stresses.

Other and further objects and advantages of the invention will be hereinafter set forth and the novel features thereof defined by the appended claims.

In the drawings:

Fig. 1 is a view in elevation of an embodiment of our invention, the outer shell being shown in section to disclose the arrangement of the insulating elements;

Fig. 2 is an enlarged fragmentary sectional view showing the details of construction and arrangement of parts of the form of dampener shown in Fig. 1;

Fig. 3 is a detailed perspective, partly broken away and shown in section, of one of the insulating sleeve units employed;

Figs. 4 and 6 are fragmentary sectional views showing modified forms of insulating sleeve units;

Figs. 5 and 7 are detailed perspective views, partly broken away and shown in section, of the sleeve units disclosed in Figs. 4 and 6, respectively;

Figs. 8 and 9 are sectional and perspective views, respectively, of the dampener shown in Fig. 4 but used in inverted position; and Fig. 10 is a further modification in which the cylindrical shell and rod have the shoulders formed thereon and the rubber is forced therebetween under pressure and vulcanized.

In carrying out our invention, the dampener device is preferably made up as an independent unit so as to permit of ready installation at any desired point in a sucker rod line, but the functions of the device will best be carried out where one unit device is installed at the top just below the polish rod and another such unit is inserted at the bottom over the pump. In this way the vibrations arising from surface equipment and those from the pump may be prevented from being transferred to the intermediate portion of the rod.

We desire it to be further understood that this invention may be carried out in many different ways, and those depicted herein to exemplify it are selected primarily because of their greater commercial adaptability, especially as influenced by the readiness of establishing a bond of the rubber to the metal surfaces in the face of the narrow space between the parts, which presents a problem difficult of solution when the length of the joint or connection is considerable.

Like reference characters designate corresponding parts in the several figures of the drawings.

Referring now to the drawings and specifically describing that form of the invention illustrated in Figs. 1 to 3, I designates a jacket or cylindrical shell in the upper end of which is screwed the plug 2 having the usual pin 3 for connection with the polish rod (not shown) of the pump.

Within this shell is mounted the central rod 4 formed with a head 5 at the top and the connecting pin 6 for connection with the sucker rod line at the bottom. Also within this shell and on the rod 4 are mounted one or more insulating units 7 of the form clearly illustrated in Fig. 3, the number of these sleeves units being variable depending upon the required length of the joint. These units are held in place by the seating collar 8 screwed into the bottom of the shell, and they are so constructed and arranged that metal to metal contact between the shell and the rod 4 is impossible.

Each of these insulating units is composed of an inner sleeve 9 snugly fitting the rod 4, an outer sleeve 10 correspondingly fitting in the shell and an intermediate rubber or elastic composition dampener member 11 forming a yieldable connection between the sleeves. This rubber wall is bonded to the respective surfaces of the sleeves, said surfaces being roughened and properly treated to insure attachment of the rubber to the surface when vulcanized in the usual manner.

The inner sleeve is provided with an outer annular shoulder 12 at one end, and the outer sleeve 10 is formed with a corresponding shoulder 13 at the end thereof opposite that of the shoulder 12. In the form of the invention described, the sleeves are staggered in arrangement and spaced sufficiently apart to provide a free section of the rubber connecting the sleeves together, said section being distorted under load or shearing stresses.

Owing to this arrangement of the parts, when load is imposed during the pumping operation by the up pull of the rod, for example, the rubber between the sleeves is distorted by the longitudinal movement of the inner sleeve relative to the outer and this causes the rubber to bunch in the space between the sleeves and expand laterally under compression. Under these circumstances and due to the lateral pressure, tendency for the rubber to shear or be torn from the surfaces of the sleeves is reduced and tremendous strains may, therefore, be sustained without any metal to metal contact.

Passing now to the form shown in Figs. 4 and 5 of the drawings, it will be noted that the insulating units 7' are made up with concentric oppositely tapered sleeves 14 and 15 so that the bunching action of the rubber when one sleeve is moved relatively to the other in the longitudinal direction takes place, this being an important feature of our construction.

Likewise, in Fig. 6 the outer and inner sleeves 16 and 17 are reversely tapered and, in addition, the outer sleeve is formed with an annular inner shoulder 18 and the inner sleeve with an outer shoulder 19 which function to crowd the rubber within the space under distortional stress, exerting pressure within the sleeve and preventing the rubber from being torn from the surfaces.

We desire it to be understood that while we have shown in this arrangement a relatively large number of the insulating units above described, a single unit of sufficient length may be employed, as shown in Fig. 10, limitation in this respect being defined by the narrow space between the rod and the shell and the ability to place the raw rubber therein and vulcanize the same. Ostensibly, the inner surface of the shell and the outer surface of the rod 4 may be treated and the rubber bonded directly thereto, but such is not as convenient in practice in view of the difficulties of handling lengthy joints such as this would involve.

Figs. 8 and 9 disclose an arrangement similar to that shown in Figs. 4 and 5 and, therefore, the detail parts have been denoted by the same reference characters. The insulating and dampening units in these figures have been inverted with respect to the showing in Figs. 4 and 5 and upon application of load stresses on the central rod 4, the rubber of the individual units is placed under tension stresses only, although the disposition of the superimposed inner and outer sleeves of the several units is such that the base of the upper inner sleeve 14 overhangs the bonded rubber of the insulation below, while the upper face or end of the outer sleeve of the second unit forms an engaging shoulder for the rubber cushion of the unit above and, therefore, when a number of these units are availed of there is an appreciable compression or bunching of the rubber between these shoulders of the respective units, as above indicated, as well as tension on the rubber of the individual units.

Fig. 10 discloses a form in which the outer jacket or shell 1a is formed with a series of annular tapered surfaces 14a forming intermediate shoulders 14b. The upper end of the shell may be threaded to receive a plug like the part 2 of Fig. 1 although I have shown the rod connecting pin as an integral part of the shell.

The central rod 4a is also formed with a series of annular tapered surfaces 15a and intermediate shoulders 15b, as clearly disclosed in Fig. 10 of the drawings.

In this form of the invention the rubber stock in its uncured state is forced into the space between the shell 1a and the rod 4a after the surfaces of the same have been suitably roughened and treated so that upon application of suitable vulcanizing heat and pressure the rubber will be properly cured and securely bonded to the rod and shell.

A rubber or non-metallic sleeve 4b may be inserted over the lower end of the rod if desired and an apertured guide collar 1b is screw threaded into the shell 1a. When this form of the invention is interposed in the sucker rod string and load stresses applied to the device, the rubber is put under tension and compression stresses quite similar to the form shown in Fig. 8. As the tapered surfaces 14a and 15a move away from each other, the rubber bonded to their surfaces is placed under tension while the shoulders 14b and 15b move toward each other causing a bunching of the rubber between these shoulders.

From the foregoing, we believe that we are the first to provide an insulating joint in a sucker rod in which the insulating means is a wall of rubber subjected to shear. Furthermore, the provision in a vertical joint of means for transposing the vertical stresses into lateral stresses to prevent the shearing action is novel with us and we do not wish to be restricted to a particular specific way of carrying out this arrangement.

It will be quite apparent that not only are the high frequency vibrations dampened by this arrangement, but the sounds which arise from the operation of either the surface equipment or the pump itself are deadened by the rubber insulation.

Having thus described our invention, what we claim as new and desire to secure by Letters Patent is:

1. A sucker rod joint comprising a shell, means for connecting the shell in a rod line at one end thereof, seating means in the other end of the shell, a rod member mounted in said shell in spaced relation thereto, and an insulating unit comprising an inner sleeve on said rod having an enlarged upper portion, an outer sleeve spaced from said inner sleeve, having a constricted opening disposed below said enlarged upper portion, a rubber vibration dampener between said inner and outer sleeve members and between the said enlarged and constricted portions of the sleeve members, one end of said outer sleeve member resting on the seating means aforesaid, the rod member having a head seated on the other end of said inner sleeve member.

2. A vibration dampener for sucker rods comprising a unitary device including a shell, a spaced central rod member therewithin, resilient cushioning means for holding said rod member in spaced relation to said shell against metal to metal contact, said cushioning means comprising an outer sleeve member carried by said shell and having a downwardly tapering bore, a concentrically spaced inner sleeve member on said rod having an outer downwardly tapering surface, and a rubber tapered sleeve disposed between the adjacent tapering surfaces of the inner and outer sleeves and bonded thereto, whereby relative longitudinal movement between said inner and outer sleeves in one direction causes said rubber sleeve to bunch in the space between the sleeves and exert pressure laterally thereof.

3. A vibration dampener for sucker rods comprising, in combination, a shell having a support connection at one end, a centrally disposed sucker rod load element within said shell out of direct contact with said shell, means for suspending said sucker load element within the shell comprising a plurality of superposed vibration insulating units surrounding said sucker rod load element within said shell, each unit consisting of an outer cylindrical sleeve member having an inner constricted opening at its lower end, an inner sleeve member having an enlarged head at its upper end and a straight bore therethrough, and a rubber cushioning element disposed between said sleeves and bonded thereto to sustain the load element under tension and shear, means on the lower end of the shell for supporting the lower outer sleeve member, and means on the sucker rod load element projecting laterally above the upper inner sleeve member.

4. In a vibration dampener of the class described, a shell having a load support at one end, a load-carrying rod within the shell, and a plurality of vibration insulating units secured to the rod and shell, each unit comprising an outer and inner concentrically spaced sleeve member, the adjacent faces thereof tapering upwardly and having a resilient cushioning member interposed therebetween and securely bonded thereto, the opposite ends of the inner and outer sleeve members and said cushion member being disposed in spaced horizontal planes with their corresponding ends in the same plane.

5. A sucker rod joint comprising an outer shell having means at one end for connecting the shell to a rod line, a plurality of contiguously superimposed vibration dampening units secured within the shell, each comprising inner and outer spaced supporting members, said outer member of each unit being formed with a constricted opening at one end and said inner member of each unit being formed with an annular outwardly projecting enlarged portion at its other end, and a rubber cushion member disposed between said inner and outer supporting members and bonded thereto in shear relation, the upper surface of one unit and the lower surface of a spaced unit constituting confining means tending to prevent extrusion of the rubber from between the inner and outer members of the intermediate unit, and means for connecting the inner members to a sucker rod line.

JOHN F. EATON.
HUBERT D. COLLINS.